(12) United States Patent
Frayssignes (10) Patent No.: US 9,043,650 B2
(45) Date of Patent: May 26, 2015

(54) METHOD AND DEVICE FOR DETECTING LOGIC INTERFACE INCOMPATIBILITIES OF EQUIPMENT ITEMS OF ON-BOARD SYSTEMS

(75) Inventor: Anne Frayssignes, Saint-Andre (FR)

(73) Assignee: AIRBUS OPERATIONS S.A.S., Toulouse (FR)

(*) Notice: Subject to any disclaimer, the term of this patent is extended or adjusted under 35 U.S.C. 154(b) by 507 days.

(21) Appl. No.: 13/423,446

(22) Filed: Mar. 19, 2012

(65) Prior Publication Data

US 2012/0246522 A1    Sep. 27, 2012

(30) Foreign Application Priority Data

Mar. 22, 2011    (FR) ...................................... 11 52357

(51) Int. Cl.
*G06F 11/00*    (2006.01)
*G06F 11/07*    (2006.01)

(52) U.S. Cl.
CPC ........ *G06F 11/0751* (2013.01); *G06F 11/0739* (2013.01)

(58) Field of Classification Search
USPC .......................................................... 714/37
See application file for complete search history.

(56) References Cited

U.S. PATENT DOCUMENTS

| | | | |
|---|---|---|---|
| 6,892,151 B1 * | 5/2005 | Giorgetta et al. | ............... 702/71 |
| 2002/0111720 A1 | 8/2002 | Holst et al. | |
| 2004/0181712 A1 * | 9/2004 | Taniguchi et al. | ............. 714/47 |
| 2009/0198393 A1 | 8/2009 | Sims, III et al. | |
| 2010/0100249 A1 | 4/2010 | Molgaard | |

OTHER PUBLICATIONS

French Preliminary Search Report issued on Jul. 26, 2011 in corresponding French Application No. 11 52357 filed on Mar. 22, 2011 (with an English Translation of Categories).

* cited by examiner

*Primary Examiner* — Sarai Butler
(74) *Attorney, Agent, or Firm* — Oblon, McClelland, Maier & Neustadt, L.L.P.

(57) ABSTRACT

The invention in particular has as an object detecting incompatibility between equipment items of a on-board system. A logic interface associated with one equipment item comprises at least one input while a logic interface associated with another equipment item comprises at least one output. The input and the output are connected. After a minimal data definition level associated with the input and a data definition level associated with the output have been obtained (505), the said minimal data definition level associated with the input is compared (515) with the said data definition level associated with the output. Following this comparison, if the said minimal data definition level associated with the input is lower than the said data definition level associated with the output, an alarm indicating an incompatibility of these two equipment items is generated (545).

12 Claims, 5 Drawing Sheets

METHOD AND DEVICE FOR DETECTING LOGIC INTERFACE INCOMPATIBILITIES OF EQUIPMENT ITEMS OF ON-BOARD SYSTEMS

This invention relates to the compatibility of computers and software applications in an on-board system and more particularly to a method and a device for detecting and signaling logic interface incompatibilities of equipment items of an on-board system, in particular of computers and software applications carried on board aircraft.

Modern aircraft comprise more and more electronic and computer systems to improve their performances and to assist the pilot as well as the crew members during their missions. Thus, for example, the fly-by-wire controls make it possible to reduce the mechanical complexity of transmitting controls to the actuators and therefore the weight associated with these controls. Likewise, the presentation of pertinent information items enables the pilot to optimize the flight paths and to respond rapidly to any detected incident. Such information items are, in particular, speed, position, heading, meteorological and navigational data. These electronic and computer systems as a whole generally are called the avionics.

For reasons of reliability, the avionics often was shared functionally by specific modules, also called LRU (abbreviation for Line Replaceable Unit in English terminology). According to this architecture, a point-to-point transmission mode is used between each module. Thus, for example, the flight controls are handled in a special device while the electrical supply is handled in another one. In this way, a specific function is associated with each module.

Furthermore, each module supporting a critical function preferably is redundant so that the failure of one module does not bring about the loss of the associated function. The use of an aircraft utilizing a redundant module when the main module is faulty may necessitate a maintenance operation.

In order to improve the functionalities of the aircraft, to reduce the weight of the electronic equipment items by virtue of a greater integration, to reduce the costs by virtue of the use of generic modules, and to facilitate maintenance operations, the avionics now is more and more integrated according to an architecture called IMA (abbreviation for Integrated Modular Avionics in English terminology). According to this architecture, the functionalities of the avionic systems use as much as possible generic computation and input/output resources in which they are implemented. These resources are distributed in electronic equipment items which each comprise numerous software modules. A system of segregation or partitioning makes it possible to isolate each of the functionalities so that the failure of one function does not affect another one.

By way of illustration, patent application FR 2 903 511 describes such an architecture.

Within each electronic equipment item of the aircraft, software modules are loaded and updated by an operator who is on board the aircraft to perform these operations. The role of the operator is in particular to start the loading of these modules or these updates and to verify that the selected configuration has been properly loaded into the electronic equipment item.

Following the occurrence of a failure of an on-board module, hardware or software, maintenance operators often are led to replace the electronic equipment item comprising this module, in its entirety, in order to repair the failure. During these operations, it frequently happens that the replacement equipment item, coming from a stock of spare parts, has a version (also called Part Number in English terminology) different from that of the replaced equipment item (brokendown equipment item). Replacement therefore cannot be made in the aircraft without verification of compatibility with the other equipment items with which this equipment item is to communicate.

For these purposes, the maintenance operators use compatibility information items and authorized configurations of various equipment items, called mixability (or mixability in English terminology) information items, in a maintenance documentation from the manufacturer, for example in a documentation called IPC (abbreviation for Illustrated Parts Catalog in English terminology).

When the configuration resulting from the combination of the version of the replacement equipment item with the versions of other equipment items, communicating with this replacement equipment item, is not defined in the documentations used, the maintenance operators must turn to the manufacturer to authorize or not authorize the unknown configuration.

There thus is a need to verify that the configuration of equipment items of an aircraft, in particular following a replacement of one of them, is in conformity with the authorized configurations. Such a verification has as an object to ensure that, following a replacement operation, an unauthorized equipment item is not installed in error and that this error cannot generate failures because of the incompatibility of this replacement equipment item with those present in the aircraft.

Concerning the physical devices, in particular for the connectors, there are keying mechanisms preventing a connection or an installation of a non-conforming equipment item. Nevertheless, such a configuration verification problem also relates to downloading in error, in one or more on-board computers, a version of software applications not anticipated or not conforming to the configuration, that is to say, for example, the downloading of a software application the version of which is incompatible with those of other installed software applications or other equipment items.

The invention makes it possible to resolve at least one of the problems set forth above.

The invention thus has as an object a computer method for detecting incompatibility between at least two equipment items of an on-board system, this method being characterized in that, a logic interface associated with one of the said at least two equipment items comprising at least one input and a logic interface associated with the other of the said at least two equipment items comprising at least one output, the said at least one input being connected to the said at least one output, the method comprises the following steps, obtaining a minimal data definition level associated with the said at least one input of the said one of the said at least two equipment items and a data definition level associated with the said at least one output of the said other of the said at least two equipment items;

comparing said minimal data definition level associated with the said at least one input of the said one of the said at least two equipment items with the said data definition level associated with the said at least one output of the said other of the said at least two equipment items; and, in response to the said comparing step, if the said minimal data definition level associated with the said at least one input of the said one of the said at least two equipment items is lower than the said data definition level associated with the said at least one output of the said other of the said at least two equipment items, generating an alarm indicating an incompatibility of the said at least two equipment items.

In this way the method according to the invention makes it possible to determine simply, rapidly and automatically the incompatibility between equipment items of an on-board system from characteristic data of their interfaces, able to be obtained easily, in particular when the equipment items are operational.

According to a specific embodiment, the said obtaining step comprises obtaining, for each equipment item of the said on-board system the incompatibility of which with another equipment item is analyzed, a minimal data definition level associated with each input of the equipment considered, the said comparing step being performed for each minimal definition level obtained. In this way the method according to the invention makes it possible to determine the incompatibility of an equipment item with several others to which it is connected according to characteristic data of their interfaces.

The said obtaining step advantageously further comprises obtaining, for each equipment of the said on-board system transmitting at least one datum to one of the said equipment items the incompatibility of which with another equipment item is analyzed, a data definition level associated with at least one output of the equipment item considered in order to facilitate determination of incompatibility between the equipment items considered.

According to a specific embodiment, the method further comprises a step of selecting equipment items of the said on-board system the incompatibility of which with other equipment items is analyzed, the said selection being determined according to a criticality level of the equipment items of the said on-board system. The incompatibility of the equipment items thus is optimally determined.

The method preferably further comprises a step of transmitting an identifier of the said one of the said at least two equipment items and of the said other of the said at least two equipment items if the said minimal data definition level associated with the said at least one input of the said one of the said at least two equipment items is lower than the said data definition level associated with the said at least one output of the said other of the said at least two equipment items. In this way, the method according to the invention makes it possible to easily identify the incompatible equipment items.

Still according to a specific embodiment, the method further comprises a step of transmitting at least the said generated alarm to a centralized data processing system separate from the said on-board system. In this way the method according to the invention makes it possible to remotely detect problems of incompatibility of equipment items of an on-board system.

The method preferably further comprises a preliminary step of transmitting at least one request, the said minimal data definition level associated with the said at least one input of the said one of the said at least two equipment items and the said data definition level associated with the said at least one output of the said other of the said at least two equipment items being obtained in response to the said request. In this way the method according to the invention makes it possible to determine the incompatibility between equipment items of an on-board system on demand.

Advantageously, the said steps of obtaining, comparing and generating an alarm in response to the said comparing step are performed periodically according to a state associated with the said on-board system. In this way the method according to the invention makes it possible to determine the incompatibility between equipment items of an on-board system automatically and regularly.

Still according to a specific embodiment, the said minimal data definition level associated with the said at least one input of the said one of the said at least two equipment items and the said data definition level associated with the said at least one output of the said other of the said at least two equipment items are received in the form of UDP-type frames.

The invention also has as an object a computer program comprising instructions adapted for implementing each of the steps of the method described above when the said program is run on a computer, a device comprising means adapted for implementing each of the steps of the method described above and an aircraft comprising such a device.

The advantages obtained with this computer program, this device and this aircraft are similar to those cited above.

Other advantages, purposes and characteristics of this invention become apparent from the detailed description that follows, provided by way of non-limitative example with reference to the attached drawings in which;

FIG. 1, comprising FIGS. 1a and 1b, partially illustrates an on-board system of an aircraft;

FIG. 4, comprising

In general, the invention has as an object the detecting and signaling of incompatibilities of modules, hardware or software, of an on-board system, particularly in aircraft. This detecting and signaling of incompatibilities here uses the detecting of incompatibilities between logic interfaces of computers and/or software applications, generically called equipment items in the remainder of the description.

Such equipment items may belong to the avionics, to an open-world system or to any other security domain of the aircraft.

It is seen first of all that an incompatibility between equipment items results from interfaces between these equipment items. In other words, if equipment items become incompatible, it is that the information items exchanged between these equipment items have evolved. Consequently, control of the interfaces between equipment items makes it possible to control the incompatibilities between these equipment items. In fact, it is accepted here that an internal evolution of an equipment item having a repercussion on an equipment item that is linked thereto assumes that this internal evolution is propagated in one way or another via the outputs of the equipment item that has evolved.

Furthermore, it is seen that for many years certain aircraft manufacturers have been paying particular attention to evolutions of equipment items. Thus, throughout the development of the on-board equipment items, as well as for any modification of these equipment items after entry into service of an aircraft, evolutions of mechanical, physical and logic interfaces between computers and/or software applications are studied and approved. Approvals between data-transmitting equipment items and other data-consuming equipment items in particular may be formalized by contract in a document often called SID (abbreviation for System Interface Description in English terminology).

Moreover, a technical description of exchanged data, typically comprising a description of the physical outputs (for example the formats of the connectors) and the logic outputs (for example a type such as an integer, Boolean or floating, minimum, maximum values, a resolution and a coding mode) is stored in a centralized database. The latter preferably is used for storing information items relating to all the outputs of all the equipment items carried on board aircraft for a given program.

Such a database also may contain the links between data-producing equipment items and equipment items consuming these data, representing subscriptions, that is to say the result of formalization by contract of the interface through the SID of one equipment item at the outputs of another one. Typically the evolutions of characteristics of outputs of an equipment item entail a renegotiation of the contract of understanding on the interface between the equipment items (new edition of the SID and capture of the modified characteristics in the centralized database).

Moreover, in order to establish definitions of the interfaces of equipment items, typically of computers, so as in particular to enable suppliers of these equipment items to work with stable input specifications, the evolutions of the output characteristics of equipment items and subscriptions preferably are orchestrated in synchronized manner: the evolutions are grouped to be processed by lots (batches processing). In other words, all the equipment items affected by a change of definition level, called PROCESSING in the remainder of the description, evolve together at the same moment. Extracts from the centralized database after finalization of the interface modifications (characteristics of the transmitted information items and subscriptions) are obtained after each PROCESSING. These extracts from the database, for a given equipment item, at once defining its outputs and its inputs, are called ICD (abbreviation for Interface Control Document in English terminology) and are filed after each PROCESSING.

There is, for example, one PROCESSING per month for a given development program for an aircraft. These PROCESSINGS typically are numbered incrementally, for example from 001 to 999. In this way, a PROCESSING (or TRT) represents a definition level (or a version) of an interface of one or more inputs and/or outputs.

In this way designers may establish an interface specification for an equipment item (for a given standard of this equipment item, defining a development level thereof) by delivering to their supplier the ICD with a given version level, representative of the characteristics of the data computed and transmitted in connection with the functions implemented in the equipment item (according to its standard).

Figure 1A:
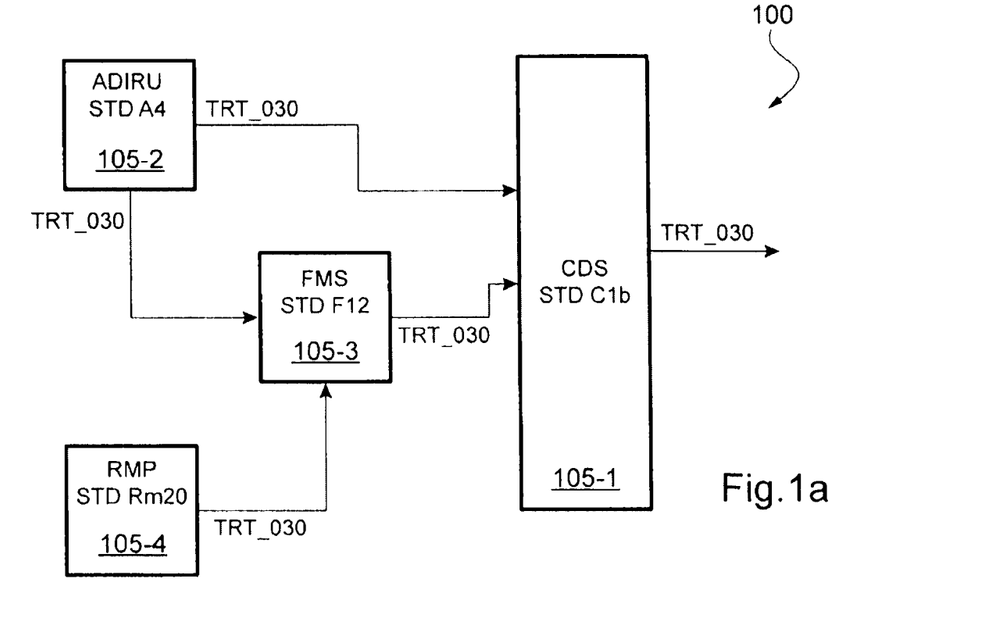
Figure 1B:
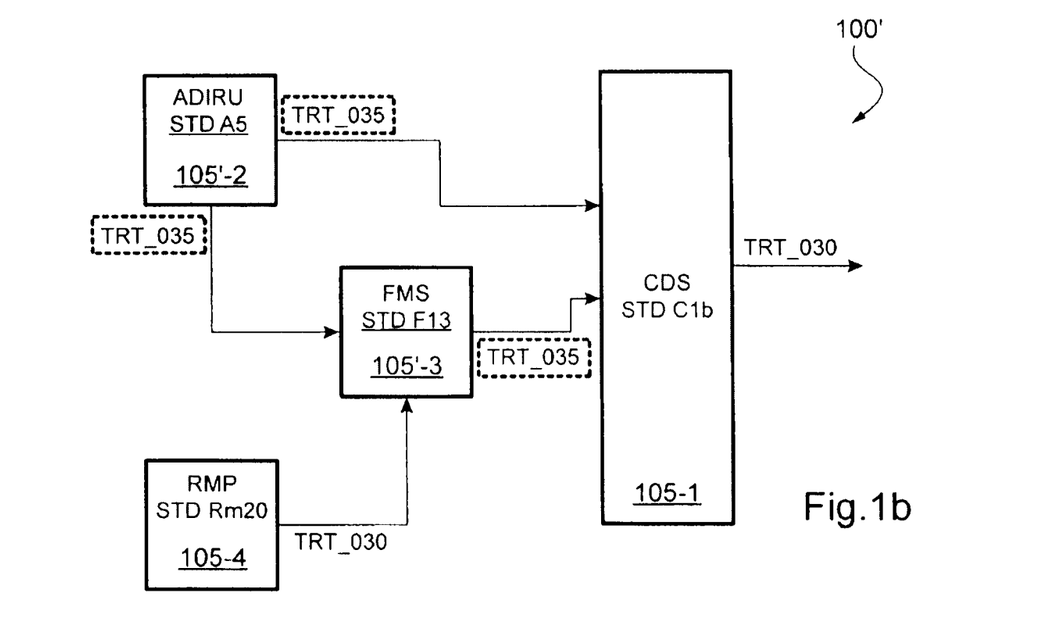

FIG. 1, comprising FIGS. 1a and 1b, illustrates a part of an on-board system of an aircraft, here comprising four equipment items.

As illustrated on FIG. 1a, on-board system 100 comprises a first equipment item referenced 105-1 here consisting of a control and display system (also called CDS, abbreviation for Control and Display System in English terminology) with standard (marked STD) C1b, receiving data from a second equipment item referenced 105-2 here consisting of a data system of ADIRU (acronym for Air Data Inertial Reference Unit in English terminology) type with standard A4 and a third equipment item referenced 105-3 here consisting of a flight management system (also called FMS, abbreviation for Flight Management System in English terminology) with standard F12. As illustrated, flight management system 105-3 receives data from ADIRU 105-2 and from a fourth equipment item referenced 105-4 here consisting of a radio management system (also called RMP, abbreviation for Radio Management Panel in English terminology) with standard Rm20.

Equipment items 105-1 to 105-4 have defined and approved their interfaces with a given PROCESSING, that is to say with a given definition level, here PROCESSING No. 030 (TRT__030).

Thus, if FMS 105-3 evolves for implementing a new function for which it needs new information items originating from ADIRU 105-2, equipment items 105-2 and 105-3 must agree on a new interface which may be finalized during a subsequent PROCESSING, for example PROCESSING No. 035 (TRT__035). In this case, if the output interface of ADIRU 105-2 to CDS 105-1 and the output interface of FMS 105-3 to CDS 105-1 are not affected by the implementation of the new functions in equipment items 105-3 and 105-2, CDS 105-1 is compatible with the output interfaces of equipment items 105-2 and 105-3 of the new PROCESSING No. 035.

With reference to FIG. 1b, showing an on-board system 100' similar (apart from the standard of the equipment items) to on-board system 100 of FIG. 1a, it is considered that ADIRU 105'-2, with standard A5, breaks down and is replaced by an equivalent equipment item but with standard A4 the output interface of which corresponding to PROCESSING No. 030 does not provide access to information items necessary for the functioning of FMS 105'-3 with standard F13. Thus, the resulting configuration comprising FMS 105'-3 with standard F13 and an ADIRU equivalent to ADIRU 105'-2 but with standard A4 is not correct.

If, on the contrary, FMS 105'-3 with standard F13, although needing information items from ADIRU 105'-2 with standard A5 with an output interface corresponding to PROCESSING No. 035 is capable, pursuant to the absence of information items introduced in this PROCESSING, of passivating or reducing the new functions to a secured mode acceptable from an operational point of view, the resulting configuration comprising FMS 105'-3 with standard F13 and an ADIRU equivalent to ADIRU 105'-2 but with standard A4 is acceptable.

In order to determine whether a configuration is acceptable or, on the contrary, is not correct, each equipment item that may be involved defines, for each of its standards, the minimal necessary PROCESSING reference, that is to say the minimal definition level that it expects for each of its inputs (data coming from other equipment items). It is accepted here that if an equipment item of a given standard defines its inputs relative to another equipment item according to a given PROCESSING reference, a higher standard of this equipment item must define its inputs relative to this other equipment item according to a given PROCESSING reference which cannot be prior to the PROCESSING reference linked to the given standard. In other words, regressions (for PROCESSING references, or definition level) are ruled out here.

In this way, in accordance with the invention, it is necessary to obtain, for each equipment item concerned, a list relating to minimal PROCESSING references for each of the input data and PROCESSING references for each of the output data of the equipment item. Nevertheless, it is seen here that in practice, it generally is not necessary to resort to several PROCESSING references for output data. Thus, typically, a single PROCESSING reference is used for all of the outputs of an equipment item.

Figure 2:
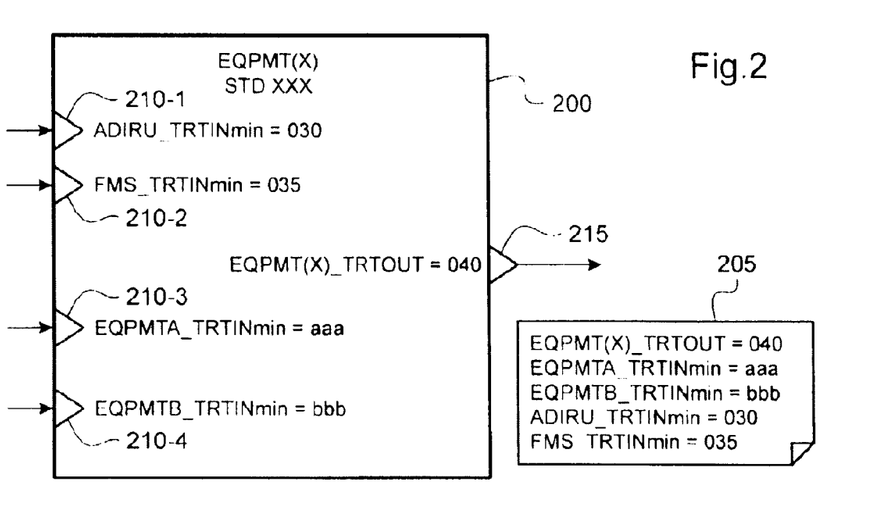
FIG. 2 schematically illustrates an equipment item as well as a corresponding list of input and output data definition versions of this equipment item.

FIG. 2 schematically illustrates an equipment item 200 as well as corresponding list 205 of minimal PROCESSING references for the input data and PROCESSING references for the output data of this equipment item.

Equipment item 200, designated as equipment item "EQPMT(X)", with standard XXX, here comprises four inputs referenced 210-1 to 210-4 as well as an output reference 215.

As indicated, input 210-1 corresponds to an output of an ADIRU-type equipment item the minimal PROCESSING reference for which is 030 (ADIRU_TRTInmin=030). Likewise, input 210-2 corresponds to an output of an FMS-type equipment item the minimal PROCESSING reference for which is 035 (FMS_TRTInmin=035). Similarly again, inputs 210-3 and 210-4 each correspond to an output of an equipment item EQPMTA and EQPMTB the minimal PROCESSING reference of which is aaa and bbb respectively (EQPMTA_TRTInmin=aaa and EQPMTB_TRTInmin=bbb).

The sole output 215 of equipment item 200 here corresponds to a PROCESSING reference equal to 040 (EQPMT(X)_TRTOUT=040).

List 205 comprises the output PROCESSING reference for equipment item 200 as well as the minimal PROCESSING reference for each of its inputs (EQPMT(X)_TRTOUT=040, EQPMTA_TRTInmin=aaa, EQPMTB_TRTInmin=bbb, ADIRU_TRTInmin=030, FMS_TRTInmin=035).

As described below, such a list may be transmitted via a communication network, for example a network of AFDX (abbreviation for Avionics Full DupleX in English terminology) type, in the form of frames.

According to a specific embodiment, one application is responsible for determining all or a part of the lists relating to the minimal PROCESSING references for input data and the PROCESSING references for output data of the equipment items of the on-board system. These lists advantageously are constructed from data originating from a centralized database such as that described above.

Alternatively, according to another embodiment, a function is implemented in each equipment item concerned in order to generate a list such as that described with reference to FIG. 2. Steps of such a function are described with reference to FIG. 3.

Figure 3:
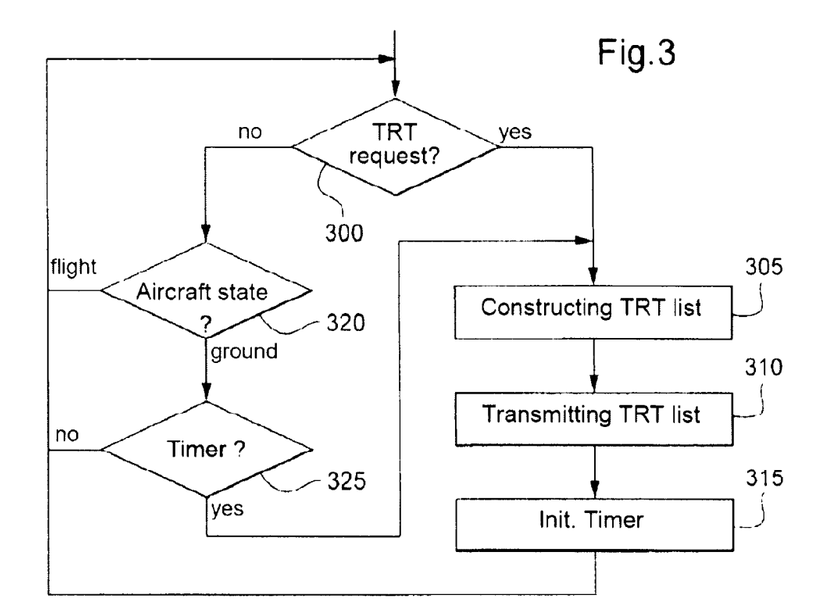
FIG. 3 schematically illustrates certain steps implemented in an equipment item in order to generate and transmit a list of definition versions for input and output data of an equipment item.

After a request (step 300) to transmit a list relating to the minimal PROCESSING references for input data and the PROCESSING references for output data of the equipment item, such a list, marked list TRT, is constructed (step 305). The information items used to construct this list may be obtained locally in a memory of the equipment item considered or from a centralized database such as that described above.

When the list is constructed, it is transmitted, via a communication network such as AFDX, to an application for management of compatibility of equipment items (step 310). Advantageously, a timer function then is initialized (step 315). Such a timing function makes it possible, if need be, to transmit periodically (according to the parameters of the timer function), a list relating to the minimal PROCESSING references for input data and the PROCESSING references for output data of the equipment item considered. It is seen that this function is initialized when the function presented on FIG. 3 is run (step not shown).

If no request to transmit a list relating to the minimal PROCESSING references for input data and the PROCESSING references for output data of the equipment item is received (step 300), the state of the aircraft preferably is determined (step 320). In fact, if for example, the aircraft is in flight, it is unlikely that an equipment item has been changed. Consequently, it may prove to be pointless to verify the configuration of the equipment items. If the aircraft is in a particular state, for example on the ground, another test is performed (step 325) in order to determine whether the time limit set by the timing function is reached. If so, the steps of construction and transmission of the list relating to the minimal PROCESSING references for input data and the PROCESSING references for output data of the equipment item considered as well as the step of initialization of the timer function (steps 305 to 315) are carried out.

The generated list relating to the minimal PROCESSING references for input data and the PROCESSING references for output data of the equipment item considered in particular may be transmitted via a communication network, particularly in the form of one or more UDP (abbreviation for User Datagram Protocol in English terminology) frames.

According to a specific mode of implementation, the frame or frames representing the list considered may consist of one or more frames the useful data, called payload in English terminology, zone of which is organized in predetermined manner. According to this embodiment, illustrated on FIG. 4a, the payload zone comprises a set of fields, each field, having a predetermined address in the frame, corresponding to a PROCESSING reference of a predefined input or output.

Figure 4A:
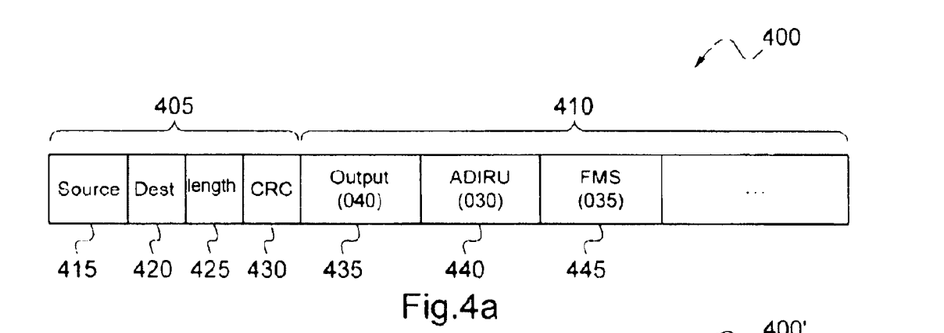
FIGS. 4a and 4b, illustrates exemplary UDP frames that may be used for transmitting a list of definition versions for input and output data of an equipment item, via a communication network.

As illustrated on FIG. 4a, UDP frame 400 comprises a header 405 and a payload zone 410. Header 405 typically comprises a source port field 415 indicating the port from which the frame is sent, a destination port field 420 indicating the port to which the frame is sent, a length field 425 which indicates the total length of the UDP frame and a checksum field 430 (or CRC, abbreviation for Cyclic Redundancy Check in English terminology) making it possible to check the integrity of the frame.

The source port in particular may be used to identify the equipment item having transmitted the frame and therefore to determine the equipment item to which the indications provided in the payload zone, in particular the PROCESSING references, relate.

Payload zone 410 here comprises a first field 435 indicating the reference for the PROCESSING associated with the output "Output" of the equipment item considered, for example, with reference to FIG. 2, the value 040. Similarly, payload zone 410 here comprises a second and a third field 440 and 445 indicating the references for the minimal PROCESSING required by the inputs associated with the "ADIRU" and "FMS" equipment items, respectively, for example with reference to FIG. 2, the values 030 and 035, respectively.

Thus, in accordance with this embodiment, the address, in the frame, at which there is a reference for PROCESSING an input or an output, is predetermined and does not vary during running of the incompatibility management application.

According to another specific mode of implementation, the frame or frames representing the list considered may consist of one or more frames the useful data (payload) zone of which comprises a series of character strings (for example ASCII characters) providing the names of equipment items from which data are received (or the names of their outputs involved) as well as the values of the associated PROCESSING references. The name of an equipment item preferably is the one that is to be displayed by a central alarm system. According to this embodiment, illustrated on FIG. 4b, the payload zone comprises a set of pairs of fields, each pair of fields comprising an equipment-item or output name and an associated PROCESSING reference.

Figure 4B:
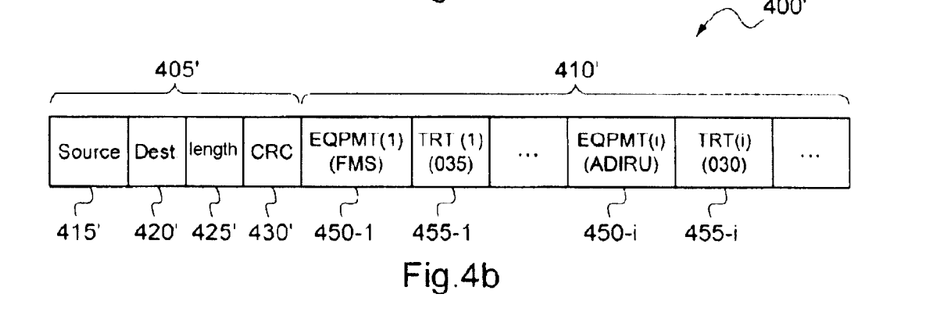

As illustrated on FIG. 4b, UDP frame 400' comprises a header 405' and a payload zone 410'. Like the header 405 described with reference to FIG. 4a, header 405' typically comprises a source port field 415' indicating the port from which the frame is sent, a destination port field 420' indicating the port to which the frame is sent, a length field 435' which indicates the total length of the UDP frame and a checksum field 430' (CRC) making it possible to check the integrity of the frame.

Payload zone 410' here comprises a first pair of fields the first field 450-1 of which indicates the name EQPMT(1) of a specific equipment item and the reference TRT(1) for the PROCESSING associated with this equipment item. By way of illustration, with reference to FIG. 2, equipment item EQPMT(1) may be the FMS the reference TRT(1) for the associated PROCESSING of which is the value 035. Similarly, payload zone 410' comprises an $i^{th}$ pair of fields the first field 450-i of which indicates the name EQPMT(i) of a specific equipment item and the reference TRT(i) for the PROCESSING associated with this equipment item. Again, by way of illustration, with reference to FIG. 2, equipment item EQPMT(i) may be the ADIRU the reference TRT(1) for the associated PROCESSING of which is the value 030.

Although not shown here, payload zone 410' further preferably comprises a reference to the output of the equipment item considered as well as the associated PROCESSING reference.

It is seen that the order of the pairs of fields may be any.

There are other embodiments for transmitting a list relating to the minimal PROCESSING references for input data and the PROCESSING references for output data of a given equipment item. Thus, for example, such a list may be transmitted in the form of MIB SNMP (abbreviation for Management Information Bases/Simple Network Management Protocol in English terminology) and the application implementing acquisition of these frames may require sending thereof through an SNMP request.

As described above, such frames comprising lists relating to minimal PROCESSING references for input data and PROCESSING references for output data of equipment items of an on-board system advantageously are transmitted according to a minimum periodicity, for example at least every minute, in at least one predetermined state, for example when the aircraft comprising this on-board system is on the ground.

The transmitted lists comprising lists relating to minimal PROCESSING references for input data and PROCESSING references for output data of equipment items of an on-board system are received via an application, a computer or a specific equipment item, called application for management of equipment item incompatibilities in the remainder of the description, in order to determine whether the at least partial configuration of the on-board system is acceptable or, on the contrary, whether it is not correct.

Figure 5:
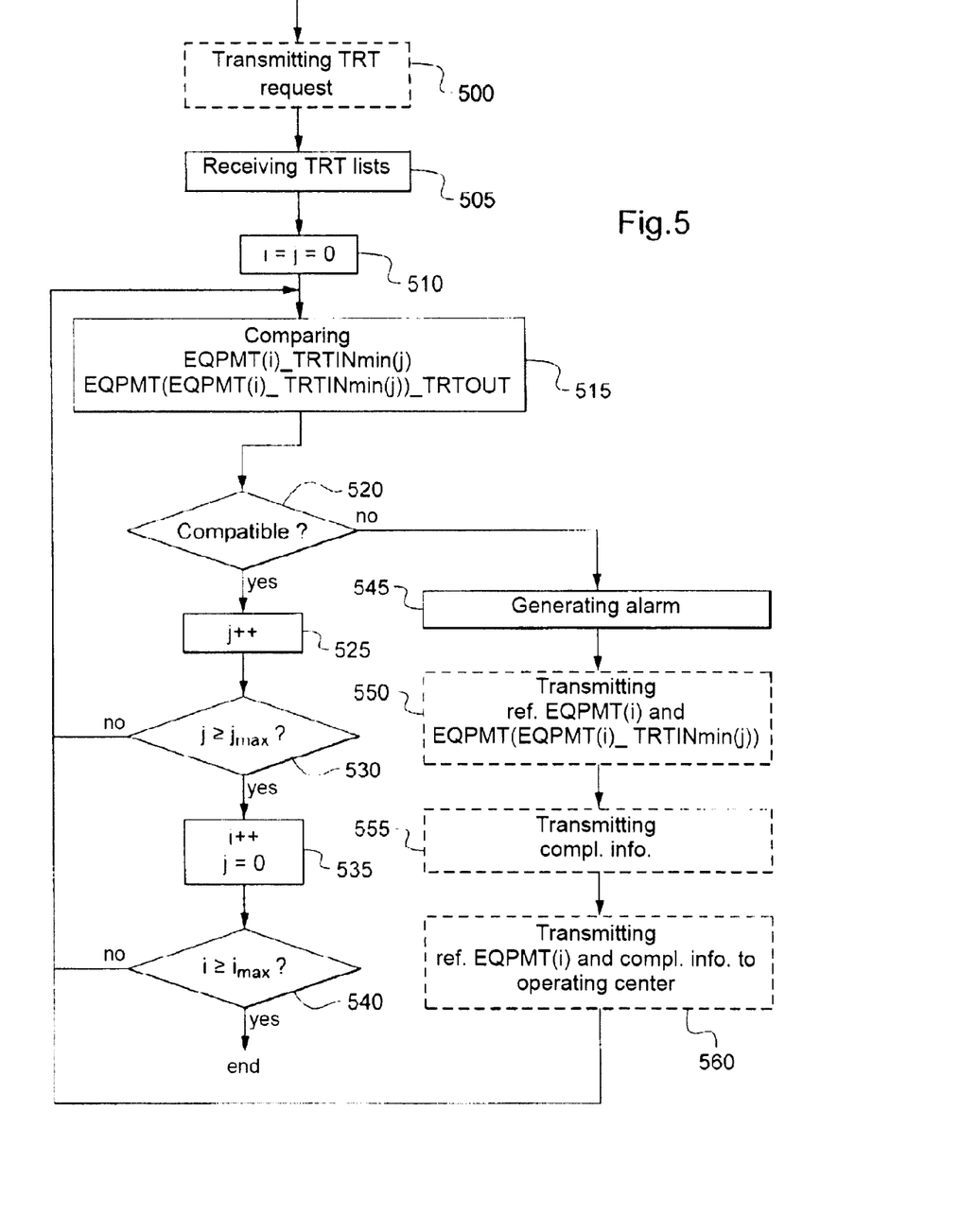
FIG. 5 illustrates steps of an exemplary algorithm according to the invention for determining whether the configuration of an on-board system is acceptable or, on the contrary, whether it is not correct.

Steps implemented by this application for management of equipment item incompatibilities in order to determine whether the configuration of the on-board system is acceptable or, on the contrary, whether it is not correct, are illustrated on FIG. 5.

As illustrated, a first step (step 500), optional, has as an object transmitting a request to receive, in response, lists relating to the minimal PROCESSING references for input data and the PROCESSING references for output data of the equipment items to be analyzed, of an on-board system.

The analyzed equipment items are, for example, equipment items having a DAL (acronym for Design Assurance Level in English terminology) level higher than or equal to a predetermined threshold, for example C (failures the criticality of the consequences of which are higher than or equal to "major") and/or equipment items transmitting data to such equipment items. For these purposes, a step of selecting (not shown) equipment items to be analyzed may be performed, this selection preferably being based on a criticality level of the equipment item.

The lists relating to minimal PROCESSING references for input data and PROCESSING references for output data of equipment items to be analyzed are received (step 505) for example in the form of frames, in response to a prior request or spontaneously (in particular when management of transmission of these lists is handled, at least partially, by each of the equipment items or by a third-party application).

For each equipment item to be analyzed, the minimal PROCESSING reference associated with each input of this equipment item is compared with the PROCESSING reference associated with the output of the equipment item from which the data received by the input considered originate. In other words, the minimal definition level associated with each input of this equipment item is compared with the definition level associated with the output of the equipment item from which the data received by the input considered originate.

By way of illustration, with reference to FIG. 2, the PROCESSING reference of the output of the ADIRU is compared with the minimal PROCESSING reference (030) of the corresponding input of equipment item 200 and the output PROCESSING reference of the FMS is compared with the minimal PROCESSING reference (035) of the corresponding input of this same equipment item.

For these purposes, the variables i and j are initialized at the value zero (step 510). The variable i here represents an index on the equipment items to be analyzed while the variable j represents an index on each input of an equipment item considered.

In a following step (step 515), the minimal PROCESSING reference for the input considered, that is to say the input having the index j, of the analyzed equipment item, that is to say of the equipment item having the index i, marked EQPMT(i)_TRTINmin(j), is compared with the PROCESSING reference for the output of the equipment item from which the data received by the input considered originate, marked EQPMT(EQPMT(i)_TRTINmin(j))—TRTOUT.

A test then is performed in order to determine whether the input having the index j of the equipment item having the index i is compatible with the output of the equipment item from which the data received by this input (step 520) originate. In other words, a test is performed in order to determine whether the minimal PROCESSING reference for the input having the index j of the equipment item having the index i (EQPMT(i)_TRTINmin(j)) is lower than or equal to the PROCESSING reference for the output of the equipment item from which the data received by the input considered (EQPMT(EQPMT(i)_TRTINmin(j))_TRTOUT) originate.

If the input having the index j of the equipment item having the index i is compatible with the output of the equipment item from which the data received by this input originate, the value of the index j is incremented by one (step 525) and a test is performed (step 530) in order to determine whether the index j has reached its maximal value ($j \geq j_{max}$), that is to say whether all the inputs of the equipment item having the index i have been analyzed. If not, the algorithm loops back to step 515 to analyze the input corresponding to the new index j.

If on the contrary, the index j has reached its maximal value, the index i is incremented by one and the index j is reinitialized to the value zero (step 535). A test then is performed (step 540) in order to determine whether the index i has reached its maximal value ($i \geq i_{max}$), that is to say whether all the equipment items to be analyzed have been. If not, the algorithm loops back to step 515 to analyze each input of the equipment corresponding to the new index i.

If, on the contrary, the index i has reached its maximal value, the process is terminated.

If the input having the index j of the equipment item having the index i is not compatible with the output of the equipment item from which the data received by this input (step 515) originate, an alarm signal is generated (step 545). Advantageously such an alarm signal is transmitted to a centralized alarm system each time and for as long as there is an input of an equipment item that is not compatible with the output of the equipment item from which the data received by the input considered originate, that is to say as soon as and while there is a pair of values (i, j) such as EQPMT(i)_TRTINmin(j) <EQPMT(EQPMT(i)_TRTINmin(j))_TRTOUT. The alarm produced may consist, for example, of a message of the type "AIRCRAFT CONFIGURATION POTENTIAL INCOMPATIBILITY."

According to a specific embodiment, an identification of the equipment items involved is transmitted (step 550) to the centralized alarm system in order to allow display of these information items and to facilitate the task of the maintenance operator. These equipment items are the equipment items corresponding to the index i as well as the equipment items the output data of which are received by the input considered. It should be noted that several incompatibility problems may be detected and that, consequently, several pairs of equipment items involved may be indicated to the maintenance operators.

Additional information items advantageously also are transmitted to the centralized alarm system (step 555). Such information items have as an object, for example, to enable identification of the instant of occurrence of the incompatibility and to make it possible to correlate this event with other manipulations performed within the aircraft to which the on-board system considered belongs.

Still according to a specific embodiment, information items equivalent to those transmitted during steps 545, 550 and/or 555 also are transmitted (steps 560) to an operations center of the airline company operating the aircraft. These information items are transmitted via standard communication means to make it possible to look ahead to corrective action.

The algorithm then loops back to step 515 to analyze the inputs and/or the next equipment items.

It is seen here that if the example given with reference to FIG. 5 relates to transmitting alarms and associated information items as soon as an incompatibility is identified, it also is possible to analyze all of the equipment items to be analyzed so as, if need be, not to transmit the alarms and associated information items until after the analysis phase.

The alarm or alarms generated in this way in particular enable the pilots and/or the maintenance operators to detect that an error in installation of equipment items, that is to say in change of computers and/or downloading of software applications, has been made. The aircraft then easily may be reconfigured in a configuration approved for flight by eliminating the error (removal of the equipment item causing the incompatibility).

As seen above, analysis of the equipment items may be limited, for example, to equipment items having a DAL level higher than or equal to C. Alternatively, analysis of the equipment items may be limited, for example, to equipment items having a DAL level higher than or equal to C as well as to equipment items providing information items to equipment items implementing functions using these information items and having a DAL level higher than or equal to C.

Figure 6:
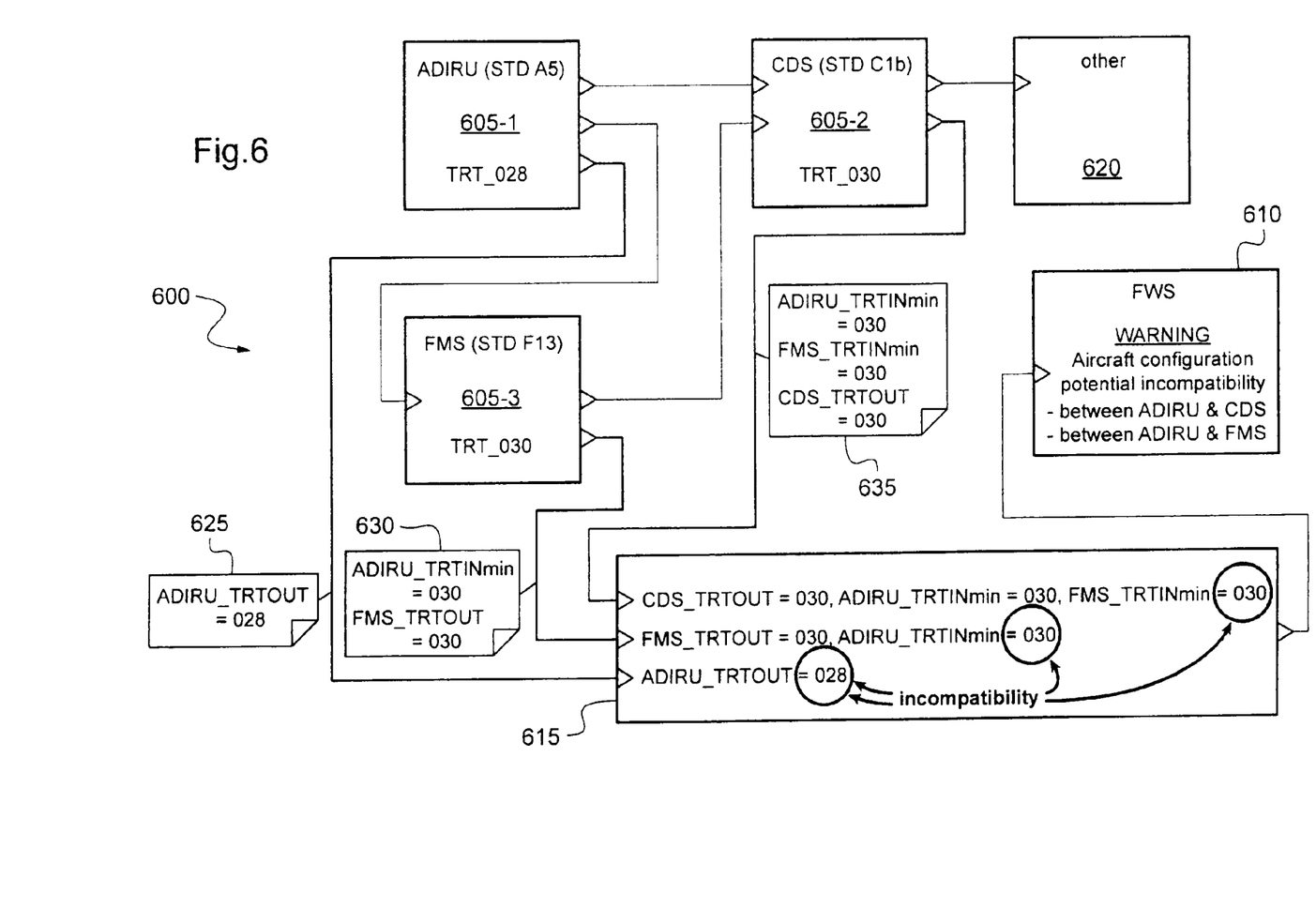
FIG. 6 illustrates an exemplary implementation of the algorithm described with reference to FIG. 5.

FIG. 6 illustrates an exemplary implementation of the algorithm described with reference to FIG. 5.

FIG. 6 shows a part 600 of an on-board system comprising several equipment items of which equipment items 605-1, 605-2 and 605-3 are to be monitored. These equipment items here are computers of ADIRU, CDS and FMS type, respectively. The system further comprises an equipment item 610 of FWS (abbreviation for Flight Warning System in English terminology) type, a centralized equipment monitoring application, marked LIINDA (acronym for Logical Interface INcompatibility Detection Application in English terminology), here implemented in one computer 615 and another computer 620.

The computers here are connected to one another via an AFDX-type communication network. For reasons of clarity, only logic links between these equipment items are shown on FIG. 6.

An output of ADIRU 605-1 is connected to an input of CDS 605-2, by a virtual link (also called virtual link in English terminology, able to be regarded as a logic routing similar to a wired link), in order to transmit data, for example service data. Another output of ADIRU 605-1 is connected to an input of FMS 605-3, by a virtual link, in order to transmit data such as position data. Another output again of ADIRU 605-1 is connected to the LIINDA application to enable it to obtain information items characterizing ADIRU 605-1, in particular list 625 relating to the minimal PROCESSING references for input data and the PROCESSING references for output data. Since ADIRU 605-1 here does not have an input connected to another equipment item, list 625 comprises only a PROCESSING reference for output data (ADIRU_TRTOUT), this reference, equal to 028, here being common to all the outputs.

Similarly, an output of FMS 605-3 is connected to an input of CDS 605-2, by a virtual link, in order to transmit data, for example service data. Another output of FMS 605-3 is connected to the LIINDA application to enable it to obtain information items characterizing FMS 605-3, in particular list 630 relating to the minimal PROCESSING references for input data and the PROCESSING references for output data. Since FMS 605-3 here has an input connected to ADIRU 605-1, list 625 comprises a minimal PROCESSING reference for input data originating from ADIRU 605-1 (ADIRU_TRTINmin), equal to 030, as well as a PROCESSING reference for output data (FMS_TRTOUT), equal to 030.

Likewise, an output of CDS 605-2 is connected to an input of computer 620, by a virtual link, in order to transmit data, for example service data. Another output of CDS 605-2 is connected to the LIINDA application to enable it to obtain information items characterizing CDS 605-2, in particular list 635 relating to the minimal PROCESSING references for input data and the PROCESSING references for output data. Since CDS 605-2 here has an input connected to ADIRU 605-1 and an input connected to FMS 605-3, list 635 here comprises two minimal PROCESSING references for input data originating from ADIRU 605-1 (ADIRU_TRTINmin) and from FMS 605-3 (FMS_TRTINmin), equal to 030, as well as a PROCESSING reference for output data (CDS_TRTOUT), equal to 030.

The LIINDA application therefore can compare the requirements of equipment items 605-1, 605-2 and 605-3 with the PROCESSING references associated with the data provided thereto. In this way, by making these comparisons, the application infers therefrom that the minimal PROCESSING references required for the input data of CDS 605-2 and FMS 605-3, coming from ADIRU 605-1, are equal to 030 while the PROCESSING reference associated with the data coming from ADIRU 605-1 is equal to 028, that is, a value lower than the minimum required value. An incompatibility of ADIRU 605-1 with FMS 605-3 and CDS 605-2 therefore is identified and an alarm is generated sent to FWS 610. The alarm here comprises an identification of the equipment items involved: "Aircraft configuration potential incompatibility between ADIRU & CDS and between ADIRU & FMS."

Although the invention has been described essentially according to PROCESSING references, it is possible to use a different granularity and to dynamically use information items relating to processings of data exchanged via interfaces of the equipment items. Thus, by way of illustration, the process which specifically manages the organization of the PROCESSINGS and the ICDs may dynamically obtain the information items relating to the evolution of data transmitted by an equipment item according to the state of the latter (start-up, initialization, computation cycle for data considered, etc.). Such information items, defining definition levels, then may be used as the PROCESSING references, complementarily or otherwise, in combination with the minimal definition levels, in order to determine incompatibilities between equipment items.

In this way, according to the invention, a minimal data definition level associated with an input of an equipment item and a data definition level associated with an output of an equipment item may comprise PROCESSING references and/or any other characteristic representative of a state of the data exchanged via this input or this output.

Furthermore, according to a specific embodiment, it is possible to inhibit or cancel alarms transmitted according to the invention, for example in order to authorize flights in specific configurations, in particular for in-flight tests.

Moreover, it is seen that all or some lists relating to the minimal PROCESSING references for input data and the PROCESSING references for output data of the equipment items to be analyzed may be acquired by equipment items which undertake, for reasons of security (also called safety in English terminology) complementary checks on the validity of the information items which they acquire from all or some of the equipment items.

Figure 7:
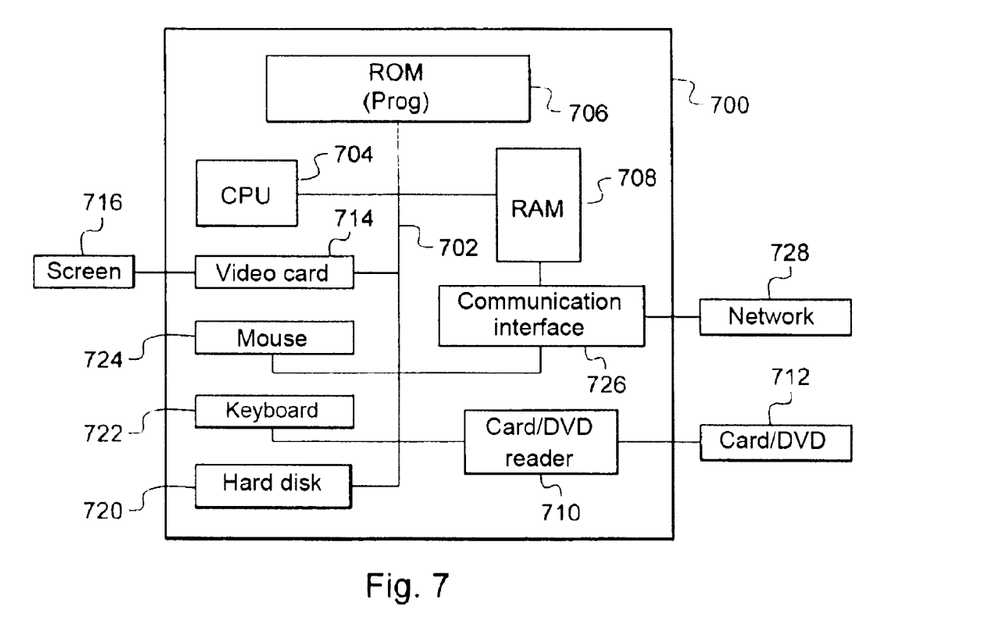
FIG. 7 illustrates an exemplary data processing device adapted for at least partially implementing the invention.

FIG. 7 illustrates an exemplary device that can be used for implementing the invention at least partially, in particular steps described with reference to FIGS. 3 and 5. Device 700 is, for example, a computer, in particular a server of ANSU (abbreviation for Avionic Network Server Unit in English terminology) type.

Device 700 preferably comprises a communication bus 702 to which there are connected:
- a central processing unit or microprocessor 704 (CPU, abbreviation for Central Processing Unit in English terminology);
- a read-only memory 706 (ROM, acronym for Read Only Memory in English terminology) that can comprise the operating system and programs such as "Prog";
- a random access or cache memory 708 (RAM, acronym for Random Access Memory in English terminology) comprising registers adapted for recording variables and parameters created and modified in the course of running the aforesaid programs;
- a reader 710 for removable storage medium 712 such as a memory card or a disk, for example a DVD disk, making it possible in particular to download a software application; and
- a graphics card 714 connected to a screen 716.

Optionally, device 700 also may have the following components:
- a hard disk 720 that can comprise the aforesaid "Prog" programs and data processed or to be processed according to the invention;
- a keyboard 722 and a mouse 724 or any other pointing device such as a light pen, a touch screen or a remote control enabling the user to interact with the programs according to the invention; and,
- a communication interface 726 connected to a distributed communication network 728, for example the AFDX network, the interface being able to transmit and to receive data, in particular to and from an equipment item of an aircraft.

The communication bus permits communication and interoperability among the various components included in device 700 or connected thereto. The depiction of the bus is not limitative and, in particular, the central unit is able to communicate instructions to any component of device 700 directly or through another component of device 700.

The executable code of each program permitting the programmable device to implement the processes according to the invention may be stored, for example, on hard disk 720 or in read-only memory 706.

According to a variant, the executable code of the programs will be able to be received through communication network 728, via interface 726, to be stored in a manner identical to that described above.

More generally, the program or programs will be able to be loaded into one of the storage means of device 700 before being run.

Central unit 704 is going to control and direct the running of the instructions or portions of software code of the program or programs according to the invention, which instructions are stored on hard disk 720 or in read-only memory 706 or else in the other aforesaid storage components. During boot-up, the program or programs that are stored in a non-volatile memory, for example hard disk 720 or read-only memory 706, are transferred to random-access memory 708 which then contains the executable code of the program or programs according to the invention, as well as the registers for storing the variables and parameters necessary for implementation of the invention.

Naturally, in order to satisfy specific needs, an individual competent in the field of the invention will be able to apply modifications in the foregoing description.

The invention claimed is:

1. A method for detecting incompatibility between at least two equipment items of an on-board system, a first logic interface being associated with one of said at least two equipment items and including at least one input, and a second logic interface being associated with the other of said at least two equipment items and including at least one output, said at least one input being connected to said at least one output, the method comprising:

obtaining a minimal data definition level associated with said at least one input of said one of said at least two equipment items and a data definition level associated with said at least one output of said other of said at least two equipment items, the data definition level being the sole data definition level associated with each said at least one output;

comparing said minimal data definition level associated with said at least one input of said one of said at least two equipment items with the data definition level associated with said at least one output of said other of said at least two equipment items; and in response to said comparing, when the minimal data definition level associated with said at least one input of said one of said at least two equipment items is lower than the data definition level associated with said at least one output of said other of said at least two equipment items, generating an alarm indicating an incompatibility of said at least two equipment items.

2. The method according to claim 1, wherein said obtaining includes obtaining, for each equipment item of said on-board system the incompatibility of which with another equipment item is analyzed, a minimal data definition level associated with each input of the equipment item considered, said comparing being performed for each minimal data definition level obtained.

3. The method according to claim 2, wherein said obtaining further includes obtaining, for each equipment item of said on-board system transmitting at least one datum to one of said equipment items the incompatibility of which with another equipment item is analyzed, a data definition level associated with at least one output of the equipment item considered.

4. The method according to claim 2 or claim 3, further comprising selecting equipment items of said on-board system the incompatibility of which with other equipment items is analyzed, the selection being determined according to a level of criticality of the equipment items of said on-board system.

5. The method according to claim 1, further comprising transmitting an identifier of said one of said at least two equipment items and of said other of said at least two equipment items when the minimal data definition level associated with said at least one input of said one of said at least two equipment items is lower than the data definition level associated with said at least one output of said other of said at least two equipment items.

6. The method according to claim 1, further comprising transmitting at least said generated alarm to a centralized data processing system separate from said on-board system.

7. The method according to claim 1, further comprising transmitting at least one request, the minimal data definition level associated with said at least one input of said one of said at least two equipment items and the data definition level associated with said at least one output of said other of said at least two equipment items being obtained in response to the request.

8. The method according to claim 1, wherein said obtaining includes obtaining, comparing and generating the alarm in response to said comparing are performed periodically according to a state associated with said on-board system.

9. The method according to claim 1, wherein the minimal data definition level associated with said at least one input of said one of said at least two equipment items and the data definition level associated with said at least one output of said other of the at least two equipment items are received in the form of UDP-type frames.

10. A non-transitory computer-readable storage medium storing computer-readable instructions that, when executed by a computer, cause the computer to perform a method comprising:

obtaining a minimal data definition level associated with said at least one input of said one of said at least two equipment items and a data definition level associated with said at least one output of said other of said at least two equipment items, the data definition level being the sole data definition level associated with each said at least one output;

comparing the minimal data definition level associated with said at least one input of said one of said at least two equipment items with the data definition level associated with said at least one output of said other of said at least two equipment items; and in response to said comparing, when the minimal data definition level associated with said at least one input of said one of said at least two equipment items is lower than the data definition level associated with said at least one output of said other of said at least two equipment items, generating an alarm indicating an incompatibility of said at least two equipment items.

11. A device comprising:

a processor configured to obtain a minimal data definition level associated with said at least one input of said one of said at least two equipment items and a data definition level associated with said at least one output of said other of said at least two equipment items, the data definition level being the sole data definition level associated with each said at least one output;

compare the minimal data definition level associated with said at least one input of said one of said at least two equipment items with the data definition level associated with said at least one output of said other of said at least two equipment items; and in response to said comparing, generate an alarm indicating an incompatibility of said at least two equipment items when the minimal data definition level associated with said at least one input of said one of said at least two equipment items is lower than the data definition level associated with said at least one output of said other of said at least two equipment items.

12. Aircraft comprising the device according to claim 11.

* * * * *